United States Patent [19]
Cantagallo et al.

[11] 3,733,849
[45] May 22, 1973

[54] APPARATUS FOR TRANSPORTATION OF COMMODITIES

[75] Inventors: Raymond E. Cantagallo, Drexel Hill; J. Lutz, Swarthmore, both of Pa.

[73] Assignee: Sun Shipbuilding & Dry Dock Company, Chester, Pa.

[22] Filed: June 29, 1971

[21] Appl. No.: 158,025

Related U.S. Application Data

[62] Division of Ser. No. 834,281, June 18, 1969, abandoned.

[52] U.S. Cl. ..........................62/414, 62/415, 98/10, 62/239
[51] Int. Cl. ............................................F25d 17/06
[58] Field of Search.......................62/168, 413, 414, 62/415, 62, 78, 407–412; 98/8, 10, 9

[56] References Cited

UNITED STATES PATENTS

| | | | |
|---|---|---|---|
| 3,521,459 | 7/1970 | Rath | 62/78 |
| 2,589,031 | 3/1952 | Allyne | 62/62 |
| 2,286,252 | 6/1942 | Bergstrom | 98/10 |
| 2,359,796 | 10/1944 | Russell, Jr. | 62/168 X |
| 2,534,272 | 12/1950 | Kleist | 62/414 X |
| 2,923,384 | 2/1960 | Black | 189/34 |
| 3,246,592 | 4/1966 | Rath | 98/31 |

*Primary Examiner*—William F. O'Dea
*Assistant Examiner*—Ronald C. Capossela
*Attorney*—George L. Church et al.

[57] ABSTRACT

Large insulated containers are used for the transport of chilled or frozen commodities. Each of the containers has its own electric-motor-driven refrigeration equipment, which is supplied with electric power from the ship or trailer chassis on which the containers are being transported. In the containers, a continuous flow of refrigerated (or, in some cases, heated) air is maintained up through and/or around the packaged commodity. Means is provided to change the atmosphere inside the container by the addition of fresh air. A temperature set point adjustment is provided to maintain the temperature of the air being circulated in the container. A relatively simple and convenient arrangement is provided for mounting the refrigeration equipment on the container.

1 Claim, 9 Drawing Figures

Patented May 22, 1973
3,733,849
3 Sheets-Sheet 1
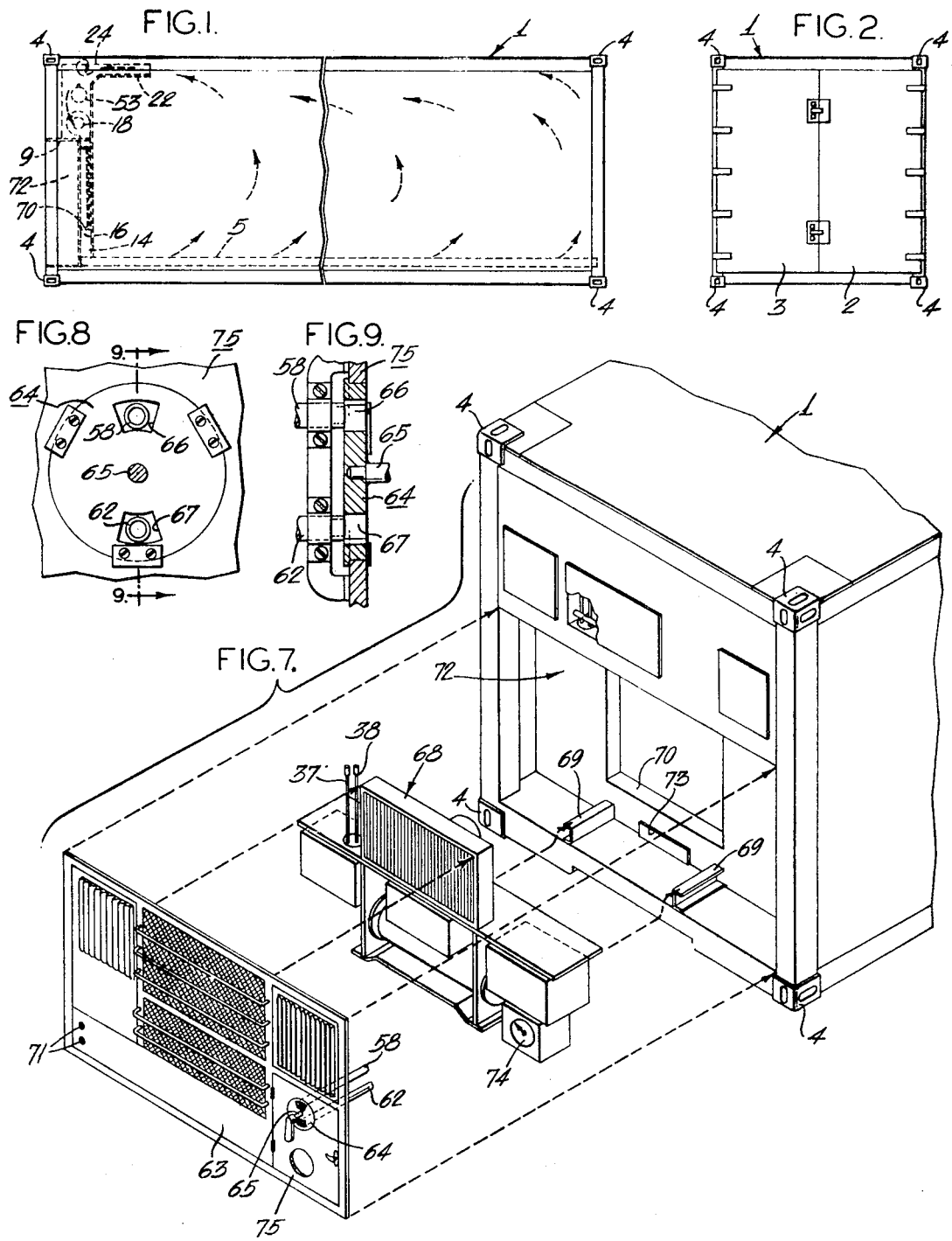
INVENTORS:
RAYMOND E. CANTAGALLO
ROBERT J. LUTZ
Donald R. Johnson
ATTY.

Patented May 22, 1973
3,733,849
3 Sheets-Sheet 2
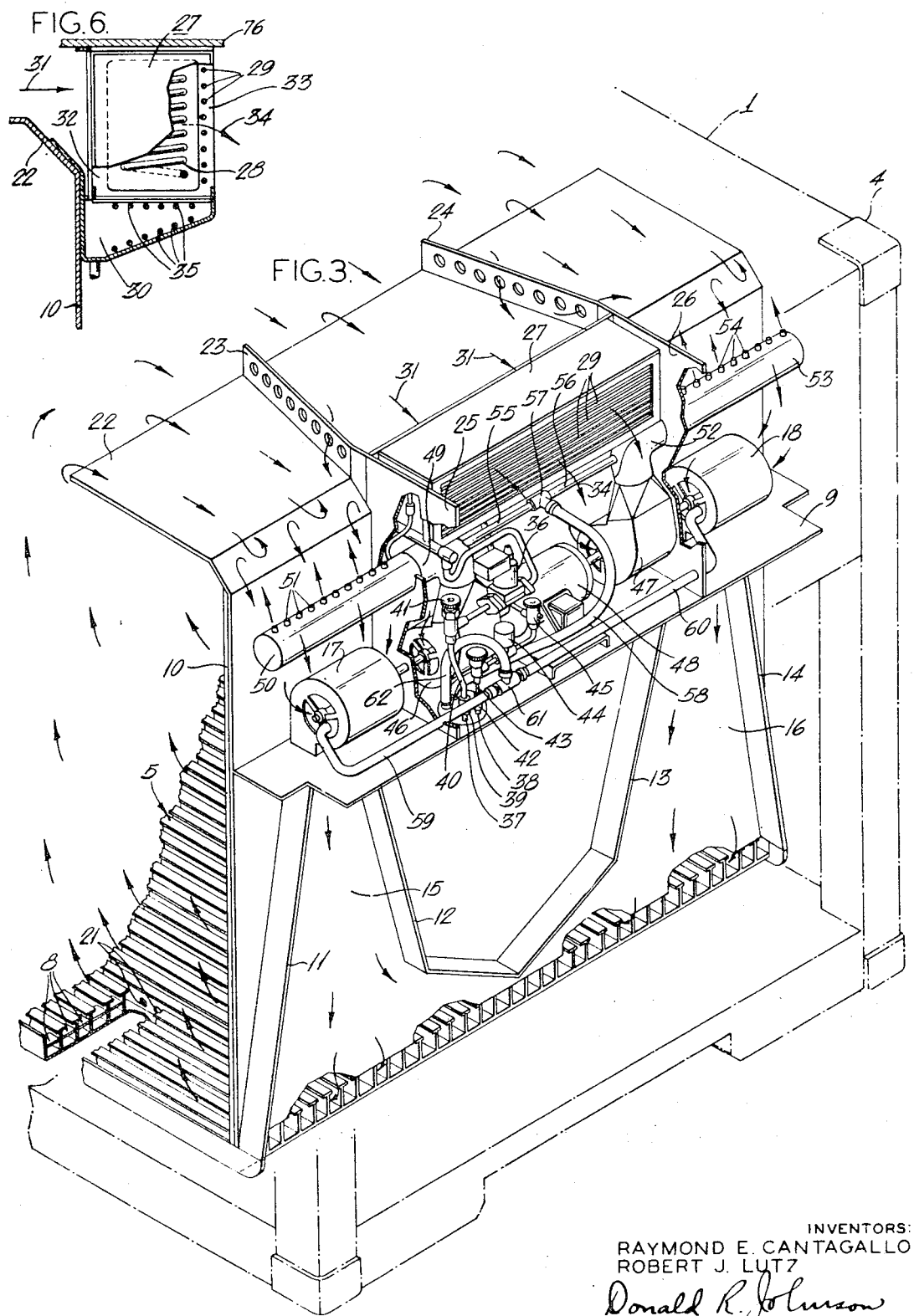
INVENTORS:
RAYMOND E. CANTAGALLO
ROBERT J. LUTZ
Donald R. Johnson
ATTY.

INVENTORS.
RAYMOND E. CANTAGALLO
ROBERT J. LUTZ
Donald R. Johnson
ATTY

APPARATUS FOR TRANSPORTATION OF COMMODITIES

This application is a division of our copending application, Ser. No. 834,281, filed June 18, 1969 now abandoned and is related to Ser. No. 156,124 now U.S. Pat. No. 3,699,870, the latter being a continuation of said abandoned case.

This invention relates to apparatus for storing and transporting a chilled or frozen commodity. By way of example only, the apparatus will be described in connection with the storage and transportation of bananas, which must be maintained chilled to a certain temperature during transport to prevent premature ripening thereof, in view of the long ocean voyage involved. However, it is desired to be pointed out that the apparatus may be used for various other chilled or frozen commodities, and in particular for various other types of respiring commodities in addition to bananas.

The procedure used presently for the transportation, ripening (processing), and distribution of bananas between Central and/or South America and the United States is somewhat as follows: At the growing areas in the tropics, the "bunches" of bananas are cut while still green and moved to a centralized packing facility, where they are dissected into "hands", washed, and the cuts treated with a fungicide. The hands of bananas are then wrapped in a perforated polyethylene sheet and packed into corrugated cardboard boxes each holding about 40 pounds net of fruit. These individual boxes are stacked on trucks, trailers, railcars or lighters, as the case may be, and hauled to port for shipment. At the port, the individual boxes are unloaded from the transport medium, then moved aboard a ship and there stacked in a refrigerated cargo hold. During the ocean voyage, for example to a port in the Northern Hemisphere, the temperature in the refrigerated cargo hold is maintained such as to keep the bananas in their pre-climacteric (green state).

On arrival at the distant port, the boxes of fruit are unloaded from the ship and stacked on trailers or railcars for transport to a jobber's facility or a large chain store's warehouse. Upon arrival, the individual boxes of bananas are unloaded and then distributed into a series of large ventilated and temperature-controlled "ripening rooms", where (by injection into the room of an appropriate quantity of ethylene "triggering" gas, as well as by appropriate control of the temperature in the room and of the air flow through the room, in accordance with a ripening schedule) the bananas are brought into their climacteric and then on into their post-climacteric (ripening).

When the appropriate time in the ripening schedule has been reached, the individual boxes of bananas are reloaded onto trucks and transported to retail distribution points, or supermarket warehouses, as the case may be.

It may be noted that the procedure just described calls for a rather large number of separate cargo handling operations to be carried out on the individual boxes of bananas, which even with modern materials handling methods and equipment involves a considerable expense.

Also, the jobber's "markup" or commission, or the chain store's added expense (which covers the utilization of a facility mainly for ripening of the fruit) may be quite appreciable.

An object of this invention is to provide a novel apparatus for the transportation of chilled or frozen commodities.

Another object is to provide apparatus for the storage and transportation of commodities, by the use of which the cargo handling expense is minimized.

A further object is to provide a system and apparatus for the transportation and processing of bananas which bypasses or eliminates entirely the banana jobber (i.e., processor).

The foregoing and other objects of this invention are accomplished, briefly, in the following manner: Insulated containers of standard size (say, 8 feet wide by 8½ feet high by 40 feet long) are utilized for the storage and transportation of the bananas, each container having an individual refrigeration apparatus, and also means for circulating air through the interior of the respective container. The bananas are loaded into standard boxes at the tropical plantations, and these boxes are then stacked inside the containers. The bananas are then transported in these containers all the way from the tropical plantations to the retail distribution points in the Northern Hemisphere. The circulation of air in the containers is such as to provide an air washing of the fruit. Electric power for the operation of the refrigeration apparatus is supplied from the ship or trailer chassis on which the containers are being transported. By appropriate adjustment of the fresh air admitted to the interior of the container, as well as of the temperature inside the container, the bananas may be held in their pre-climacteric during the transportation, or they may be brought into their climacteric and the ensuing post-climacteric.

A detailed description of the invention follows, taken in conjunction with the accompanying drawings, wherein:

FIG. 1 is a side elevation of a container according to this invention;

FIG. 2 is a rear elevation of the container;

FIG. 3 is an isometric view of air circulating and temperature control apparatus mounted inside a container, with certain parts broken away in order to show details;

FIG. 6 is a vertical section through an evaporator employed in the apparatus of the invention, the evaporator coil unit itself being shown in elevation;

FIG. 7 is an exploded view showing the front end of a container together with unit assemblies to be mounted therein and thereon;

FIG. 8 is a partial elevational view of the front end of a container, illustrating a detail; and FIG. 9 is a sectional view taken on line 9—9 of FIG. 8.

Figure 4:
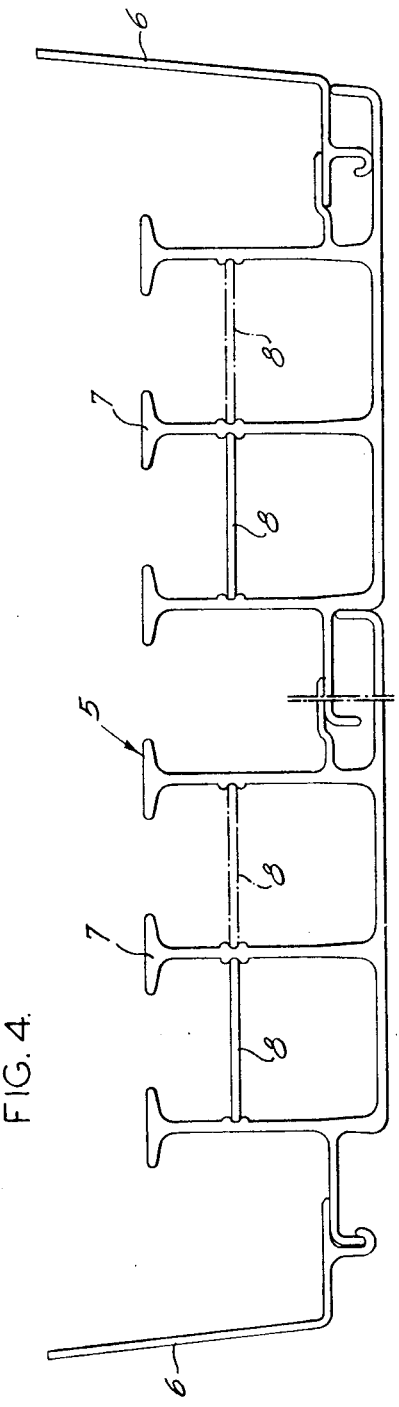
FIG. 4 is an end view of a typical assembled floor structure formed from extrusions.

An apparatus for the transportation of chilled or frozen commodities according to this invention is founded upon a container or housing 1 illustrated in side elevation in FIG. 1. Housing or container 1 is preferably of rectangular prismoidal outer configuration, with overall dimensions as follows: length, 40 feet; width, 8 feet; height, 8½ feet. Access to the interior of the container (e.g., for the placing of commodities therein, or for the removal of commodities therefrom) is had by means of two hinged access doors 2 and 3 provided at the rear end of the container, these doors being hingedly mounted at their respective outer sides to the corner posts of the container and constituting substantially the entire rear wall of the container.

The container 1 is based upon an outer framework including corner posts, and these corner posts are provided at their upper and lower ends with fittings 4 which enable the container to be handled by means of a suitable crane-suspended cargo frame or spreader, such as disclosed in Griffith U.S. Pat. No. 3,428,354.

All six faces bounding or defining the container are of double-walled construction, with suitable thermal insulation between such double walls.

A floor grating structure, denoted generally by numeral 5 (FIG. 3), is mounted on the bottom interior wall of the housing or container 1, for the purpose of supporting boxes of a commodity which is to be stored and transported in the container, this floor grating structure also providing flow channels for the circulation of air, as will later be detailed. The grating structure 5 is constructed of extruded aluminum sections which are positioned side-by-side, interlocked, and then slid into position in the longitudinal or length direction of the container, and then welded together and suitably secured (as by screws, for example) atop the bottom interior wall or floor of the housing.

Refer now to FIG. 4, which illustrates typical extruded sections which may be used to make up the floor grating structure 5. Extruded sections 6 which each have the cross-section illustrated may be used at the two opposite side edges of the floor, and the upstanding flanges of these sections may be secured as by means of screws to the interior side walls of the container. Extruded sections 7 which each have the cross-section illustrated may be used for the main or central portion of the floor, two such sections placed side-by-side being illustrated in FIG. 4. The sections 7 may interlock with the adjacent side section 6 (as illustrated for example at the left-hand side and at the right-hand side of FIG. 4), or with an adjacent central section 7 (as illustrated for example at the center of FIG. 4). Considering the main floor sections 7, it may be seen that these together have a cross-sectional shape resembling a plurality of Ts in side-by-side relation, with the bases of the Ts extended outward laterally and joined together. FIG. 4 in effect depicts a typical end view of a floor grating structure. It may be seen that the spaces between the verticals of the Ts provide a plurality of slot-like channels which extend in the direction of the length of the housing 1 and which open upwardly into the interior of the housing (it will be remembered that the floor grating structure 5 is mounted on the bottom interior wall of the housing).

To complete the floor grating structure 5, extruded sections 8 in the form of flat plates may be provided between the verticals of the Ts for strengthening purposes, each section 8 extending horizontally between adjacent verticals and the side edges of each section 8 being positioned in suitable longitudinally-extending grooves formed in such verticals. The sections 8 provide lateral support for the verticals of the Ts, and the lengths and positions of these sections may be determined in accordance with the need; these sections 8 prevent damage to the floor grating structure 5 when a fork lift truck is driven thereon.

In order to simplify the drawings as much as possible, in view of the small scale of FIG. 3, the detailed configuration (cross-section) of the extruded sections of the floor structure is not illustrated in this latter figure; likewise, the lateral support sections 8 are illustrated somewhat differently in FIG. 3 than in FIG. 4.

The container or housing 1 has a specially fabricated front wall, as will be explained in more detail hereinafter. The floor grating structure 5 terminates at its front end a little distance rearwardly from the inner face of the front wall of the housing; as a result, the slot-like channels provided between the verticals of the Ts are all open at their front or forward ends.

The specially fabricated front wall previously referred to includes a horizontally-extending shelf or support (not shown), which is secured at its forward edge to the interior front wall of the container, somewhat above the midplane of the container height. From the plane of said shelf upwardly to the top of the container, the container front wall is substantially aligned (front-to-rear) with the corner posts of the container frame, but below the plane of this shelf the container front wall is offset rearwardly say to a depth of about 14 inches, to provide an external cavity or recess for the accommodation of a "refrigeration hi-side unit", including the principal moving elements of a compression refrigeration system to be described later.

It will be recalled that the shelf or support previously referred to is located inside the container or housing. Mounted on top of such shelf, and secured thereto, is a horizontally-extending fan bed plate or mounting plate 9, which provides the main support for the principal components of a "refrigeration lo-side unit and air ventilating system". The forward edge of the mounting plate 9 seals against the front interior wall of the housing, by means of an edge gasket (not shown).

The rear edge of mounting plate 9 is coplanar with and is fastened to a vertically-extending imperforate wall 10, which extends completely across the interior of the container from one side wall to the other thereof and which constitutes in effect one inside wall of the container, since the boxes of the commodity which is being transported are stacked closely adjacent the rear face of this wall 10. The wall 10 extends both above and below the horizontal plane of mounting plate 9, and this wall is sealed at its edges to the interior side walls of the container. The lower edge of wall 10 fits tightly against the upper ends of the Ts which make up the floor structure 5, and the front face of this wall lies in the same vertical plane as the front or forward ends of the extrusions which make up the floor structure.

Below the mounting plate 9, wall 10 carries on its front face a plurality of imperforate edge-mounted members 11, 12, 13, and 14 which act as side walls for a pair of air diffuser sections or ducts 15 and 16 arranged to convey air downwardly, from the discharge outlets of the two air delivery or recirculating fans 17 and 18, respectively, to the front or open ends of the air flow channels provided by floor structure 5. Fan or blower means 17, which is preferably a centrifugal blower, is mounted on the upper side of mounting plate 9 and discharges its air downwardly through a suitable aperture in this mounting plate. The members 11 and 12 form the side walls of the first air diffuser section 15; this section expands from the discharge outlet of fan 17 (at its upper end) to include one half of the width of the floor structure 5 (at the lower end of air duct 15). Fan or blower means 18, which is preferably a centrifugal blower, is also mounted on the upper side of mounting plate 9 and discharges its air downwardly through a suitable aperture in this mounting plate. The members 13 and 14 form the side walls of the second air diffuser section 16; this section expands from the discharge outlet of fan 18 (at its upper end) to include the other half of the width of the floor structure 5 (at the lower end of air duct 16). It may be noted that members 12 and 13 meet a small distance above the floor structure 5, so that at this point sections 15 and 16 become common.

The forward or front face of wall 10, between members 11 and 12, forms the rear end wall of air diffuser section 15; similarly, this same front face, between members 13 and 14, forms the rear end wall of air diffuser section 16. When the container of this invention is assembled, the front edges of members 11–14 seal against the interior front wall of the container, so that this latter wall provides the front end walls for air diffuser sections or ducts 15 and 16.

Air is forced into the front ends of the air flow channels provided by floor structure 5, via the air diffuser sections or ducts 15 and 16, by means of the two air delivery fans 17 and 18, each of which may be rated at 1,700 cubic feet per minute at 1 inch of water head, static.

The air forced into the front ends of the air flow channel provided by the floor sections, in the manner previously described, is conveyed by these channels into the interior of the container and longitudinally toward the rear thereof, since the channels extend parallel to the length dimension of the container. As the air flows toward the rear of the container in these channels, it also flows upwardly out of the channels into the interior of the container by way of the open tops of the channels, as indicated by the arrows in FIG. 3.

Standard corrugated cardboard boxes (each holding about 40 lbs. net of fruit) into which bananas are customarily packed for shipment, are provided with aligned or registering openings or holes in their top and bottom walls (and also, in some cases, with openings or holes in their side walls, as well). When the boxes of bananas are disposed in stacks on the floor structure 5, the registering holes in the tops and bottoms thereof are formed into generally vertical chimneys. The air flowing upwardly out of the floor channels (via the open tops thereof) can and does flow through the chimneys provided in the boxes, thus coming into direct contact with the fruit in the boxes to produce an air washing thereof. That is to say, the air flows directly through the commodity as stacked. This direct air washing is particularly advantageous when the commodity is a respiring fruit, such as bananas. In addition to this, of course, the air, as it flows upwardly through the interior of the container, flows around the outside of the boxes of commodity; in the case of a frozen commodity, this flow around the outside of the boxes would in general be the only type of flow which takes place, since such boxes are ordinarily sealed air-tight.

Speaking generally, the height and configuration of the T-sections of the floor 5 are such as to allow equal distribution of the quantity of circulating air throughout the entire width and length of the container 1. The air returns from the commodity through the upper portion of the container interior, in the space between the tops of the stacks of commodity and the ceiling of the container, as will be described in detail hereinafter.

If necessary, the uniformity of the air flow can be enhanced by zoning the floor air flow channels, through appropriate utilization of the flat plate sections 8. Since the air forced into the front ends of the air flow channels is distributed over the cross-section thereof (see FIG. 4), the plate sections 8 can be used as partitions, to separate appropriate lengths of selected channels into two portions. Thus, by appropriate selection of the lengths of plate sections 8, a portion of the air can be made to flow for any desired distance along the length of the channel before it passes upward into the container, beyond the end of the partition 8.

Typically, a banana box may be 16½ inches wide, 21 inches long, and 9 inches high. It is contemplated that in a container having the dimensions previously mentioned, the boxes of bananas would be stacked eight high, with five stacks across the width of the container and 21 tiers of stacks from front to rear, for a total of $8 \times 5 \times 21 = 840$ boxes of bananas in each container. According to this invention, the air flow channels in the floor structure 5 are coupled together in groups to form a plurality of spaced unitary air ducting systems each of a cross-section (width) commensurate with the width (16½ inches) of a banana box.

Figure 5:
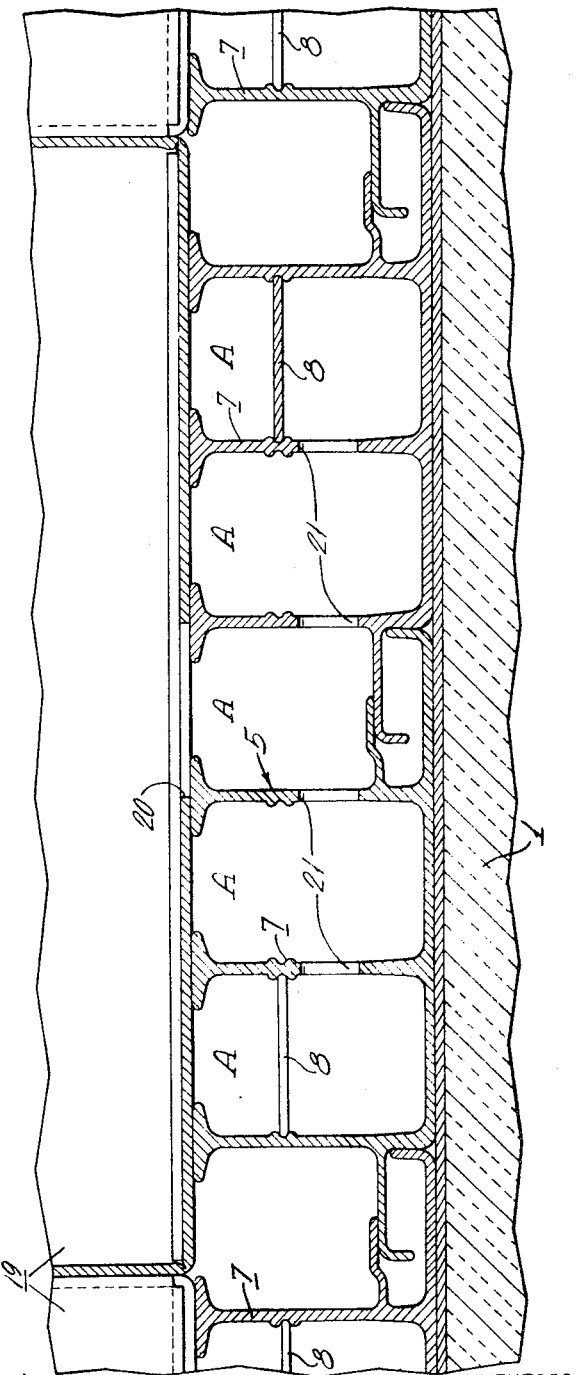
FIG. 5 is a detailed cross-sectional view, showing a portion of the interior of the container with a box of commodity therein.

Refer now to FIG. 5, which illustrates the lower portion of the lowermost banana box 19 (in a stack eight high) in position in the container 1, resting on the floor structure 5. The 16½-inch dimension of the box extends horizontally in FIG. 5. The opening or hole (previously referred to) in the bottom wall of banana box 19 is indicated at 20. By way of example, the distance between the vertical center lines of adjacent Ts in the floor structure 5 may be 2½ inches. The group of five adjacent air flow channels denoted by A, the center of which group of channels is substantially in vertical alignment with the center of hole 20, is coupled together to form a single unitary air ducting system. This coupling together is effected by means of transverse holes such as 21 in each of the four T verticals which comprise the "inside" verticals in this group of five channels. A plurality of holes is provided in each of the said four T verticals, the successive holes being spaced along the length of each vertical and the successive holes being aligned transversely in the respective verticals, in sets of four holes. It is pointed out that the holes 21 greatly reduce the isolation between the channels into which such holes open and thus have the effect of coupling the five channels together into a single unitary air ducting system.

There being five stacks of boxes across the width of the container 1, five of these unitary air ducting systems (each comprising five air flow channels coupled together by holes such as 21, in the manner previously described) would be provided in the container, these air ducting systems being distributed uniformly across the width of the container. It will be understood that each of the five unitary air ducting systems so provided extends from front to rear of the container, and each air ducting system is effective for 21 stacks of boxes, one stack in each of the 21 tiers.

It is desired to be pointed out that the floor air distribution system just described is applicable without modification to citrus carton stowage patterns. A carton generally used for the transporting of citrus products, especially for transoceanic transportation (with which the apparatus of the present invention is particularly concerned), is 17 inches long, 12 inches wide, and 14 inches high.

A widely-used stacking configuration for citrus cartons is the so-called "vertical chimney stack", wherein the cartons are stacked so as to provide or form, in each tier, centralized open areas which extend vertically through the superposed carton layers, thus forming "chimneys". In a typical stowage pattern of this type, three laterally-spaced chimneys may be formed in each tier. With this stacking configuration, the air from three of the five unitary air ducting systems previously described (to wit, the two systems closest to the respective side walls of the container, plus the center system) will feed the respective chimneys in the three stacks across the width of the container, and similarly for the respective tiers throughout the entire length of the container.

Another rather widely-used stacking configuration for citrus cartons is the so-called "spaced bonded-block" pattern, wherein the superposed layers of cartons are overlapped, both from side to side and from front to rear of the container. In this configuration, the stacks of cartons provide or form vertical zig-zag channels, there being five such channels across the width of the container. With this stacking configuration, the air from each of the five unitary air ducting systems previously described will feed a separative respective one of the five vertical zig-zag channels.

Although not illustrated in the drawings, the inner faces of the two side walls of the container, and also the inner face of the container front wall, are formed or provided with vertically-extending ribs or corrugations, so that these wall surfaces have a configuration best described as sinuous. Also, the inner surfaces of the rear access doors 2 and 3 are preferably provided with aluminum rib sections which are riveted or otherwise secured to these door surfaces; thus, these door surfaces, too, have a sinuous construction or configuration.

The container 1 has two air flow channels in the floor structure 5, one adjacent each respective side wall of the container, which are not included in the five unitary air ducting systems previously described. These two last-mentioned channels supply air to the spaces between the respective sinuous side walls and the stacks of boxes, to provide a wall or curtain of air. As may be seen in FIG. 5, some of the air flow channels in the floor structure 5 (between adjacent ones of the unitary air ducting systems, for example) do not have cross holes 21, that is, they are undrilled. These undrilled channels are used mainly to supply air to the rear of the container 1, to provide a wall or curtain of air between the sinuous inside surfaces of the rear doors and the stacked boxes; it is pointed out that the flow of air out the tops of these channels, before reaching the rear of the container beyond the stacks of boxes, is negligible because of the close packing of adjacent stacks.

It is pointed out that, when transporting a frozen commodity which may be in sealed boxes, the air flow system described, by virtue of the sinuous wall construction of the container 1, would totally envelop the boxed commodity (which may be thought of as the container cargo) in a curtain of cold air on each of its six sides; these curtains of cold air would insulate against any outside influence. In this connection, the sinuous construction of the side, front, and rear walls of the container 1 has been previously described. The floor structure 5 of course provides a curtain of air at the bottom, while the space between the tops of the stacks and the ceiling of the container (used for return air flow) provides for an air curtain at the sixth side.

Air returning from the commodity (i.e., air which has passed through and/or by the commodity) flows longitudinally of the container toward the front end thereof, in the clear space between the tops of the stacks of commodity and the ceiling of the container. This return air, on its way toward the front end of the container, passes over a substantially horizontally-extending deflecting plate 22 which extends across the entire interior width of the container 1 and which is secured at its front or forward end to the upper horizontally-extending edge of wall 10. Plate 22 is sealed along its two side edges to the respective vertically-extending interior side walls of the container, and is spaced some little distance below the ceiling of the container, so that the returning air can pass freely over this plate. In general, the substantially horizontal plane in which the tops of the stacks of commodity lie is spaced a little distance below the lower face of deflecting plate 22. As the air flows over plate 22, a partial separation of the stream into three portions is effected by means of two slightly divergent, spaced, perforated, substantially vertical plates 23 and 24 which are sealed along their lower edges to the upper face of plate 22 and are sealed along their upper edges (as by means of gaskets, not shown) to the roof of the container. The plates 23 and 24 are spaced approximately equidistantly along the width of plate 22. The perforations in plates 23 and 24 provide for a uniform distribution of the three air stream portions, as indicated by the arrows in FIG. 3.

The separation of the return air stream into three separate streams is completed by means of two substantially imperforate, spaced, parallel, vertically-extending baffles or division plates 25 and 26. The rear edge of plate 25 is sealed to the forward edge of plate 23 and to the front face of wall 10, the lower edge of plate 25 is sealed to the upper face of mounting plate 9, the vertically-extending front edge of plate 25 is sealed as by means of an edge gasket (not shown) to the front interior wall of the housing, and the upper edge of plate 25 is sealed as by an edge gasket (not shown) to the roof of the housing or container 1. The volume or space bounded by plate 25, the adjacent interior side wall of the container, the roof of the housing, the front face of wall 10, the upper face of mounting plate 9, and the front interior wall of the housing or container, forms a first combined plenum and mixing chamber. The air delivery fan or blower means 17 is located within this first chamber, and the intake of this blower means is coupled to this volume or space; as previously mentioned, the discharge of fan 17 takes place downwardly through an aperture in plate 9, into the upper end of the diffuser section 15.

The rear edge of plate 26 is sealed to the forward edge of plate 24 and to the front face of wall 10, the lower edge of plate 26 is sealed to the upper face of mounting plate 9, the vertically-extending front edge of plate 26 is sealed as by means of an edge gasket (not shown) to the front interior wall of the housing, and the upper edge of plate 26 is sealed as by an edge gasket (not shown) to the roof of the housing or container 1. The volume or space bounded by plate 26, the adjacent interior side wall of the container, the roof of the housing, the front face of wall 10, the upper face of mounting plate 9, and the front interior wall of the housing or container, forms a second combined plenum and mixing chamber. The air delivery fan or blower means 18 is located within this second chamber, and the intake of this blower means is coupled to this last-mentioned volume or space; as previously mentioned, the discharge of fan 18 takes place downwardly through an aperture in plate 9, into the upper end of the diffuser section 16.

An environmental temperature varying means, denoted generally by numeral 27, is positioned in the path of the central portion of the return air stream, in such a manner that this portion of the air stream passes through the temperature varying means, to have its temperature varied by such means. The central portion of the return air stream constitutes approximately one-third of the total quantity of returning air. It should be understood that the central portion of the return air stream is that portion between the two baffles or division plates 25 and 26. Refer now to FIG. 6. The temperature varying means comprises an evaporator coil unit 28, which is connected to a refrigeration unit to be described (a "reefer hi-side system") and which is utilized when the ambient temperature is higher than the temperature (e.g., 53° F. for the transportation of a chilled commodity such as bananas, and −10° F. for the transportation of a frozen commodity) desired to be maintained inside the container, and also a plurality of electrical heating elements 29 (such as so-called "Cal-rod units") which are utilized instead of the evaporator coil 28 when the ambient temperature is lower than the temperature desired to be maintained inside the container; typically, the heating elements 29 would be utilized for the transportation of bananas during the winter, in the Northern Hemisphere.

The evaporator coil 28 is supported by a combined drain pan and coil support 30. The rearward end of this item 30 is sealingly secured to the front face of wall 10 and to the sloping forward end of deflecting plate 22. The upper side of evaporator coil unit 28 is face-sealed to the interior ceiling 76 of the container 1 by means of a suitable gasket (not shown). The perimeter of the flanged inlet face 32 of coil unit 28 is sealed to the container interior ceiling 76, to the respective baffles 25 and 26, and to the drain pan and coil support 30. The ends of unit 28 are spaced from baffles 25 and 26. See FIGS. 3 and 6.

By virtue of the mounting arrangement just described, the entire central portion of the return air stream (represented by the arrow 31) is constrained to flow into the inlet face 32 of the evaporator coil 28, through this coil to the discharge face 33, and thence outwardly and downwardly, as indicated by arrow 34. The electrical heating elements 29 are mounted adjacent the discharge face 33, so that they are also in the path of the central portion of the return air stream; thus, when the evaporator coil 28 is not in service and the heating elements 29 are energized, the central portion of the return air stream will be heated rather than cooled as it passes through the temperature varying means 27. (Of course, when the evaporator coil 28 is operative, the heating elements 29 are unenergized, so that the central portion of the return air stream will be cooled as it passes through the temperature varying means 27.)

A plurality of electrical heating elements 35 are mounted in the drain pan 30, below the evaporator coil unit 28; these heating units are energized during defrosting cycles (later referred to), to defrost the evaporator.

The evaporator coil 28 is preferably an elongated, finned-tube refrigerant-to-air heat exchange device, the flow area of its inlet face 32 being equivalent to 2 square feet and the evaporator coil handling a flow of approximately 1,000 cubic feet per minute. To maintain the high relative humidities required to hold respiring-type commodities, the cooled air stream at 34 must be kept at the highest temperature possible, taking into consideration the desired temperature of the air delivered into the container; this will also prevent commodity chill damage. Control of the temperature of the cooled air stream 34 is accomplished by using an evaporator pressure regulating (EPR) valve 36 which allows only small temperature differentials to occur in the evaporator discharge air leaving temperature, thus providing for the required high humidity. The EPR valve 36 is motor driven (through a suitable control circuit, to be later described) to a setting which is governed by the setting of the manually-adjustable set point on a thermostatic controller which is mounted on the "refrigeration hi-side unit" and which will be later described.

A pair of refrigerant pipes 37 and 38, one of which provides the liquid refrigerant supply coupling for the evaporator coil 28 and the other of which provides the refrigerant suction gas return coupling from the evaporator coil 28, extend upwardly (from a "refrigeration hi-side unit" located below mounting plate 9, this system not being shown in FIG. 3 but being described more in detail hereinafter) through a common connector-type penetration (a "hi-lo connector plug") in plate 9. Above plate 9, a fitting 39 connects a pipe 40 to the pipe 37; pipe 40 is coupled by way of a manual shutoff valve 41 and also by way of the EPR valve 36 to the evaporator coil unit in means 27. Above plate 9, a fitting 42 connects a pipe 43 to the pipe 38; pipe 43 is coupled by way of a liquid line solenoid valve 44 and a thermal expansion valve 45 to the evaporator coil unit 28. The evaporator coil 28 and the thermal expansion valve 45 comprise components of a more or less conventional compression refrigeration system the other principal components of which (to wit, the compressor and condenser) are in the "refrigeration hi-side unit" to which reference was previously made.

Two air transfer fans 46 and 47, each of which may be a centrifugal blower rated at 500 cubic feet per minute at 0.3 inch of water head, static, are located above mounting plate 9, between baffles 25 and 26 and downstream from the temperature-varying means 27. Each of the fans 46 and 47 has its intake coupled to the central chamber, between baffles 25 and 26 and above mounting plate 9, fan 46 being located at one side of this central chamber, adjacent plate 25, and fan 47 being located at the other side of this chamber, adjacent plate 26.

All of the blowers or fans 17, 46, 47, and 18 are driven by a common electric drive motor 48 which is mounted on mounting plate 9, between fans 46 and 47. Motor 48 has a double-ended output shaft, fans 17 and 46 being coupled to one end of this drive shaft and fans 47 and 18 being coupled to the other end thereof. Fans 17, 46, 47, and 18 are all coaxial. One end of the drive shaft is sealed through plate 25 (so that fan 17, in one side chamber, can be driven), and the other end of the drive shaft is sealed through plate 26 (so that fan 18, in the other side chamber, can be driven).

The discharge from the air transfer fan 46 (which receives temperature-varied air 34 from the discharge side of means 27, in the central chamber) is fed by means of a tubular elbow 49 into one end of a horizontally-extending hollow cylindrical member 50 (whose other end is closed) which is sealed through the baffle or plate 25 and extends into the first delivery fan plenum and mixing chamber (in which blower means 17 is located). In this first delivery fan plenum chamber, a plurality of high velocity nozzles 51, mounted on member 50 and pointing upwardly, provide communication between the hollow interior of member 50 and the first delivery fan plenum chamber. Thus, about half of the conditioned (temperature-varied) central portion of the return air stream is delivered by air transfer fan 46 into the first delivery fan plenum chamber (side chamber) through the nozzles 51, for thorough mixing of the conditioned air with the side portion of the return air stream which reaches this same chamber, unconditioned. In this first plenum and mixing chamber, an unconditioned portion of the relatively warm return air stream is mixed with the conditioned colder air which is delivered by transfer fan 46 through the nozzles 51 thereinto, and this resultant cooler mixture is then redelivered or recirculated to the commodity by means of blower 17 and air diffuser section 15, through the floor structure 5.

The discharge from air transfer fan 47 (which receives temperature-varied air 34 from the discharge side of means 27, in the central chamber) is fed by means of a tubular elbow 52 into one end of a horizontally-extending hollow cylindrical member 53 (whose other end is closed) which is sealed through the baffle or plate 26 and extends into the second delivery fan plenum and mixing chamber (in which blower means 18 is located). In this second delivery fan plenum chamber, a plurality of high velocity nozzles 54, mounted on member 53 and pointing upwardly, provide communication between the hollow interior of member 53 and the second delivery fan plenum chamber. Thus, about half of the conditioned (temperature-varied) central portion of the return air stream is delivered by air transfer fan 47 into the second delivery fan plenum chamber (side chamber) through the nozzles 54, for thorough mixing of the conditioned air with the side portion of the return air stream which reaches this same chamber, unconditioned. In this second plenum and mixing chamber, an unconditioned portion of the relatively warm return air stream is mixed with the conditioned colder air which is delivered by transfer fan 47 through the nozzles 54 thereinto, and this resultant cooler mixture is then redelivered or recirculated to the commodity by means of blower 18 and air diffuser section 16, through the floor structure 5.

A respiring commodity, specifically a respiring fruit, gives off heat. This heat is taken care of (e.g., by removal from the interior of the container when warranted by the ambient temperature) through the action of the temperature varying means 27. Also, a respiring commodity takes up oxygen and produces carbon dioxide through oxidation. According to this invention, a fresh air change arrangement is used to dilute the respiration-produced gases (such as carbon dioxide) which would otherwise accumulate in the container atmosphere. If these gases were allowed to accumulate to any great extent, they would produce a deleterious effect on the respiring fruit.

The inner end of a pipe 55 for the ejection of stale air from the interior of the container is coupled to the discharge 49 of air transfer fan 46, and the inner end of a similar pipe 56 is coupled to the discharge 52 of air transfer fan 47. Pipes 55 and 56 are manifolded together at 57, as by means of a tee fitting, and from this manifolding point a common stale-air-ejection pipe 58 extends to the common connector-type penetration previously referred to (in connection with the refrigerant pipes 37 and 38). It may be seen that the pipes 55, 56, and 58 provide for the ejection of a quantity of stale air by the air transfer fans 46 and 47 (assuming that the fresh air change arrangement is in its "on" position, which will later be described, and also assuming that there is a coupling from pipe 58 to the outside of the container, as will later be described).

The inner end of a pipe 59 for the admission of fresh air into the container is coupled to the suction or intake of the air delivery fan or blower means 17, and the inner end of a similar pipe 60 is coupled to the intake of the air delivery fan 18. Pipe 59 is sealed through the baffle or division plate 25, and pipe 60 is sealed through the division plate 26. In the central chamber, pipes 59 and 60 are manifolded together at 61, as by means of a tee fitting, and from this manifolding point a common fresh-air-admission pipe 62 extends to the common connector-type penetration ("hi-lo connector plug") previously referred to. It may be seen that the pipes 59, 60 and 62 provide for the drawing-in of an equivalent amount of fresh air (equivalent to the amount of stale air ejected by pipes 56, 57, and 58) by the air delivery fans 17 and 18 (again assuming that the fresh air change arrangement is in its "on" position, and also assuming that there is a coupling from pipe 62 to the outside of the container). The fresh air change arrangement described is sized to pass 20 cubic feet per minute of stale air, which is equivalent to one change of container atmosphere per hour.

Refer now to FIG. 7. The "stale air out" pipe 58 extends from the "hi-lo connector plug" previously mentioned to a hinged panel 75 in a cover plate 63 which is suitably fastened to the body of the container at the front thereof, and which, when in position, serves as the front wall of the container. Likewise, the "fresh air in" pipe 62 extends from the aforesaid "hi-lo connector plug" to the hinged panel 75. The tubing or pipes 58 and 62 terminate at the so-called container front wall 63 in a dual-register-type opening. Refer now to FIGS. 8 and 9, which illustrate the dual-register-type opening. A disc 64 is rotatably mounted in a circular cutout provided in panel 75, this disc being manually rotatable from the front of the container by means of an outwardly-projecting central shaft 65 affixed at one end to the outer surface of the disc. The outer ends of the pipes 48 and 62 extend into close proximity to the rear face of the disc 64 (see FIG. 9). Disc 64 has therein a pair of apertures 66 and 67 which are in registry with the pipes 58 and 62, respectively (thereby to open the outer ends of these pipes to the atmosphere), when the fresh air change arrangement is in the "on" or enabled position illustrated in FIGS. 8 and 9. As illustrated in the drawings, a suitable manipulating handle is attached to the outer end of shaft 65, for manual manipulation (rotation) of this shaft. When disc 64 is manually rotated by means of shaft 65 to the "off" or disabled position, the apertures 66 and 67 are rotated out of registry with the pipes 58 and 62, so that these pipes are then closed or sealed off from the atmosphere by the solid or imperforate portions of the disc. Thus, the fresh air change arrangement is manually controllable in an "on-off" fashion (thereby to selectively enable or disable such arrangement) from the front of the container.

It is pointed out that the fresh air change arrangement is normally "on" or enabled during the preclimacteric or "hold green" portion of the trip of the bananas. This fresh air change arrangement is turned "off" at the beginning of the ripening schedule for the bananas, at the time ethylene "triggering" gas is injected into the container, and then after a predetermined time interval the fresh air change arrangement is returned to the "on" or enabled position.

All of the connecting services for the "refrigeration lo-side unit and air ventilating system" previously described are carried through the "hi-lo connector plug" or common connector-type penetration previously referred to. These services, in addition to the two refrigerant pipes 37 and 38 and the two fresh air change pipes 58 and 62, comprise a drain connection from the evaporator pan 30 (FIG. 6) and an electrical connection for the heating elements 29 and 35 in the unit 27, for the fan drive motor 48, and for the EPR valve 36 motor.

Refer again to FIG. 7. The "refrigeration hi-side unit" referred to previously, which is denoted generally by numeral 68, is adapted to be mounted in the external cavity or recess (previously mentioned) which is provided at the front end of the container. The unit 68 is adapted to be secured to a pair of supporting brackets 69 provided at the bottom of the external cavity. A rearward extension of the external cavity is provided by means of an opening 70 which is suitably sealed off from the interior of the container and which is located in the upper central portion of the container front wall 72; this opening 70 is so sized and located that it is between and above the side members 12 and 13 of the air diffuser sections 15 and 16.

The "refrigeration hi-side unit" or unit 68 includes certain components of a compression refrigeration system, to wit: an air-cooled condenser with fan, a water-cooled condenser and receiver, and an electrically-driven compressor; in addition, it includes service valves, a liquid line strainer, dryer, sight flow indicator, and associated hardware, and an electrical compressor pressure control system and thermostatic temperature controller. This unit is a factory assembled, leak tested, dehydrated and refrigerant charged unit, terminating in a pair of refrigerant pipes 37 and 38 (for connection to the evaporator coil 28 in the temperature-varying means 27, by way of the "hi-lo connector plug", as previously described). As received from the factory, the upper (outer) ends of pipes 37 and 38 are sealed, with rupture diaphragm couplings. This construction, combined with the "hi-lo connector plug" feature previously referred to, enables a quick disconnection of the unit to be accomplished during field service.

Typically, the load requirements for the unit 68 may be somewhat as follows. (1) For a chilled commodity (e.g., bananas) to be maintained at a set point of 53° F.: pulldown, 34,500 BTU per hour at 100° F. ambient and an evaporator discharge temperature of 34° F.; holding, 14,700 BTU per hour at the same ambient temperature and an evaporator discharge temperature of 43° F. (2) For a frozen commodity to be maintained at a set point of −10° F.: pulldown, 16,300 BTU per hour at 100° F. ambient and an evaporator discharge temperature of −19° F.; holding, 13,500 BTU per hour at the same ambient temperature and the same evaporator discharge temperature.

The water-cooled condenser included in unit 68 would be constructed for salt water service (it being envisioned that one of the principal uses for the container of this invention would be for the transportation of commodities aboard a ship) and tropical sea temperatures of 88° F., and would have removable heads. The condenser water connections would terminate at the front cover plate 63 (which cover plate is applied to the container 1, and is fastened thereto, after installation of the unit 68) with quick disconnect self-sealing fittings, as indicated at 71. The water-cooled condenser serves as a refrigerant receiver also, and is arranged so that the engagement of sea water hoses (with fittings 71), and the establishment of water pressure, activate the water cooling and de-activate the air-cooled condenser and its fan. The regulation of the flow of sea water through the water-cooled condenser may be controlled in response to the thermal sensing of the water discharge.

As previously stated, the front wall 72 of the container (in which the opening 70 is cut) provides the front end walls for the air diffuser sections 15 and 16, which is to say that this wall 72 forms the outer (with respect to the container) walls for these air diffuser ducts. A thermostatic controller temperature-sensing element is mounted in the air delivery stream at the entrance to the floor structure 5, this sensing element being located at the entrance end or front end of the floor structure 5, centrally of the width thereof. Thus, this sensing element is preferably located (see FIG. 3) at the common lower end of the air diffuser sections 15 and 16, where these sections join at the center of the width dimension of the container. Although the sensing element itself is not shown in the drawings, it is located on the back of a removable gasketed path 73 (FIG. 7) which covers the opening in the container front wall 72 through which the sensing element is inserted into the air delivery stream (and replaced, when necessary).

The thermostatic controller for the "refrigeration hi-side unit" 68 includes a manually-adjustable set point control which is schematically illustrated at 74. This set point control is accessible through a suitable hinged panel 75 provided in the front cover plate 63, and is manually adjusted to correspond to the temperature necessary for the transportation, in the container, of a specific commodity. Once adjusted, the set point temperature is maintained by the use of the sensing element mentioned (which is located in the air delivery stream to the commodity). The thermostatic controller preferably compares the set point temperature to the air delivery stream temperature (as sensed by the sensing element in this stream), and this controller operates in the manner set forth in the following numbered steps, which are reversible in order. (1) When the set point temperature and the air delivery stream temperature are quite close to each other (e.g., within 1° F.), the controller operates in a "neutral band", wherein neither cooling nor heating is required; in this case, the unit 68 would be shut off, and the heating elements 29 in the means 27 would be deenergized. (2) When the air delivery stream temperature is 1° F. above the set point temperature, the cooling cycle is started, by energizing the liquid line solenoid valve 44, which allows refrigerant to flow into evaporator coil 28, building up a pressure in suction line 37; through a pressure-actuated switch (not shown), this starts up unit 68. (3) When the air delivery stream temperature is 2.5° F. above the set point temperature, the EPR valve 36 is motorized to a position such that the temperature of the air leaving the evaporator at 34 is 10° F. below the set point temperature. (4) When the air delivery stream temperature is 3.5° F. above the set point temperature, the EPR valve 36 is motorized to a position such that the temperature of the air leaving the evaporator is 15° F. below the set point temperature. (5) When the air delivery stream temperature is 1° F. below the set point temperature, the heating cycle is started by suitable energization of the electrical heating elements 29 in the means 27, 50% of the total heating capacity being active under these conditions. (6) When the air delivery stream temperature is 1.5° F. below the set point temperature, the heating cycle is continued, with the total heating capacity provided by elements 29 being active under these conditions.

The thermostatic controller, and specifically the set point control, is preferably mechanically integrated with a group of switches to constitute an indicator type of control that will: (1) for a set point equal to or greater than 24° F., (a) activate the unloaders on the compressor in the refrigeration unit 68, and (b) motorize the EPR valve 36 to a position such that the temperature leaving the evaporator at 34 is 6° F. below the set point temperature; (2) for a set point less than 24° F., (a) deactivate the compressor unloaders, and (b) bypass the EPR valve 36, so that the latter is no longer effective.

It is contemplated that the defrosting cycle (which employs the heating elements 35, in the drain pan 30) will be initiated by a differential pressure switch connected across the evaporator coil 28, and terminated by a temperature sensing switch bonded to the evaporator coil. During this cycle, the evaporator fan motor 48, the compressor motor (in the unit 68), and the condenser fan motor (also in the unit 68) will be stopped.

In order to properly utilize the container of this invention, a suitable external source of electrical power is required, for the energization of the various electrical instrumentalities described, such as motors and heating elements. When the container is sitting on a wharf or dock for commodity storage, it would receive its electrical power from the port or onshore (stationary) power facility. When the container is being transported aboard a ship, it would be powered from the ship's mains. When the container is being transported on a highway or over-the-road trailer, it would be powered from a diesel engine-driven electrical generator carried by the trailer.

As previously stated, a typical commodity, for which the container of the present invention may be utilized, is bananas. For bananas, the same container may be used as a storage means, as a transport means, and also as a ripening room. This will now be further explained, by reference to a typical voyage plan.

Assume that bananas are to be transported from a plantation in Ecuador to a retailer such as a supermarket in Chicago. In the following, the times will be stated in days from "time zero", which is the time of fruit cut-down. In the winter, the temperature of the bananas at zero time (which would of course be the same as that of the ambient, in Ecuador) would be around 60° F., while in the summer this temperature would be around 90° F. or above. Beginning at zero time or cut-down, 1 day would be utilized for transporting the bananas from the plantation to a staging area, and during this first day the bananas would be at the ambient temperatures previously mentioned.

According to this contemplated voyage plan, containers would be available for loading in the staging area at the port of Guayaquil, even though the vessel (ship) does not arrive at the port for loading until a time $t=2$. Thus, at a time $t=1$, the containerization of the bananas (i.e., the loading of the bananas into containers according to this invention) starts. Also, at the time $t=1$, a 48-hour pulldown period starts, wherein the temperature of the bananas is reduced (by means of the refrigerated atmosphere provided in the container, unit 68 being active) from about 90° or about 60° to the fruit holding temperature of 53°–57° F. The vessel arrives in Guayaquil for loading at a time $t=2$, and loading of the containers onto the vessel takes place from $t=2$ to $t=3$. Thus, the container provides storage for the bananas during a two-day holding period in Ecuador, from a time $t=1$ to a time $t=3$. At the time $t=3$, when the vessel is ready to leave Guayaquil, the bananas in the containers have been pulled down to the fruit holding temperature of 53° F.

The loaded vessel leaves Guayaquil at a time $t=3$, and the Pacific Ocean transit of about 1,000 miles (from Guayaquil to Panama City, at the Pacific Ocean end of the Panama Canal) requires the time from $t=3$ to $t=$about 5¼ The Panama Canal transit extends from $t=$about 5¼ to $t=6$. This is followed by the Caribbean Sea transit of about 900 miles and then the Atlantic Ocean transit of about 1,600 miles, which together extend from $t=6$ to $t=$about 11½, at which latter time the vessel arrives in the port of New York. Thus, the sea leg of the journey (port-to-port) extends from $t=3$ to $t=$about 11½, which is about 8½ days.

In the wintertime, the ambient temperature would in general fall below the fruit holding temperature of 53° F. at some point during the Atlantic Ocean leg of the trip, so that when this point is reached the refrigeration unit 68 would be automatically turned off and the heating elements 29 would be automatically turned on or energized. In the summertime, on the other hand, the ambient temperature would in general remain above the 53° F. fruit holding temperature throughout the entire trip from the tropics to Chicago, so that under these conditions the refrigeration unit 68 would remain on for the entire trip.

The unloading of the containers from the vessel takes place from $t=$about 11½ to $t=$about 12½, at which latter time the vessel (after being unloaded) departs from New York for another trip. The bananas are held at the proper temperature in the New York terminal until $t=$about 13½, so that there is a total of 2 days holding in New York, from $t=$about 11½ to $t=$about 13½. During this terminal holding, the container is loaded on a trailer for the overland leg, from port to retailer or port to consumer.

The New York to Chicago transit of about 900 miles, on over-the-road trailers (generally, one container to a trailer, there being of course a large number of containers constructed according to this invention aboard each vessel), begins at *t*=about 13½ and ends at *t*=about 15.4, when the fruit arrives at its final destination. The overland transit, from New York to Chicago, may be by way of Philadelphia, Pittsburgh, Cleveland, Toledo, and South Bend.

According to the above-described voyage plan, which is somewhat typical, the bananas arrive at their final destination about 15½ days after they are cut down, in Ecuador. It is entirely feasible to maintain the bananas green for this length of time, by utilizing containers constructed and operated according to the present invention. If, during the latter part of the total trip, it is desired to start the ripening cycle, the set point control 74 may be adjusted to a somewhat higher temperature, the fresh air change arrangement may be turned "off" at 65 for a certain period of time, and a quantity of ethylene "triggering" gas may be added to the interior of the container. This may result in bringing the bananas into their climacteric and then on into their post-climacteric, and may be quite easily done because of the simplified control setup (only two controls being provided) of the container of this invention.

The invention claimed is:

1. A storage and transportation apparatus comprising a closed housing of rectangular prismoidal outer configuration, means providing at the bottom of said housing a plurality of parallel slot-like air flow channels which are open at one end, which extend in the direction of the length of said housing, and which open upwardly into the interior thereof, blower means mounted at one end of said housing for producing an air flow, means coupling the discharge of said blower means to the open ends of all of said channels, means coupling the intake of said blower means to the interior of said housing, adjacent the top and at said one end thereof, means dividing the air returning from the top of said housing toward the blower intake into a plurality of separate portions, environmental temperature varying means mounted at said one end of said housing in the path of one only of said portions, and power-driven means for positively moving the air which has passed through said temperature varying means to the intake of said blower means, said air moving means including means for injecting the temperature-varied air which has passed through said temperature varying means into the air in said portions of returning air other than said one portion.

* * * * *